United States Patent [19]

Gaeddert

[11] 4,297,833
[45] Nov. 3, 1981

[54] CROP PICKUP WITH OUTBOARD CAM CONTROL

[75] Inventor: Melvin V. Gaeddert, Newton, Kans.

[73] Assignee: Hesston Corporation, Hesston, Kans.

[21] Appl. No.: 83,625

[22] Filed: Oct. 11, 1979

[51] Int. Cl.³ ............................................ A01D 43/02
[52] U.S. Cl. ..................................................... 56/364
[58] Field of Search ................... 56/364, 367, 377, 372

[56] References Cited

U.S. PATENT DOCUMENTS

| | | | |
|---|---|---|---|
| 3,511,362 | 5/1970 | Gaeddert et al. | 56/364 |
| 3,751,888 | 8/1973 | James | 56/364 |
| 3,766,725 | 10/1973 | Marsh | 56/364 |
| 3,983,683 | 10/1976 | James | 56/364 |
| 4,161,859 | 7/1979 | Storm et al. | 56/364 |

FOREIGN PATENT DOCUMENTS 2124342 11/1972 Fed. Rep. of Germany ........ 56/364

Primary Examiner—Robert A. Hafer
Attorney, Agent, or Firm—Schmidt, Johnson, Hovey & Williams

[57] ABSTRACT

The windrow crop pickup has tines which are controlled by a cam at one end of the pickup reel so that the tines rock to-and-fro in a particular pattern during rotation about the axis of the reel, such action aiding in proper uplift of the crop from the ground and subsequent stripping of the crop from the tines as they release and feed the crop materials for further processing. The controlling cam for the tines is mounted on the outboard side of its supporting sidewall of the pickup, and each set of tines has an operating rocker at the end of the reel adjacent the cam which projects through an opening in the proximal sidewall and is received by the cam track such that, upon driving rotation of the reel, the stationary track imparts the desired rocking motion to the tines.

6 Claims, 4 Drawing Figures

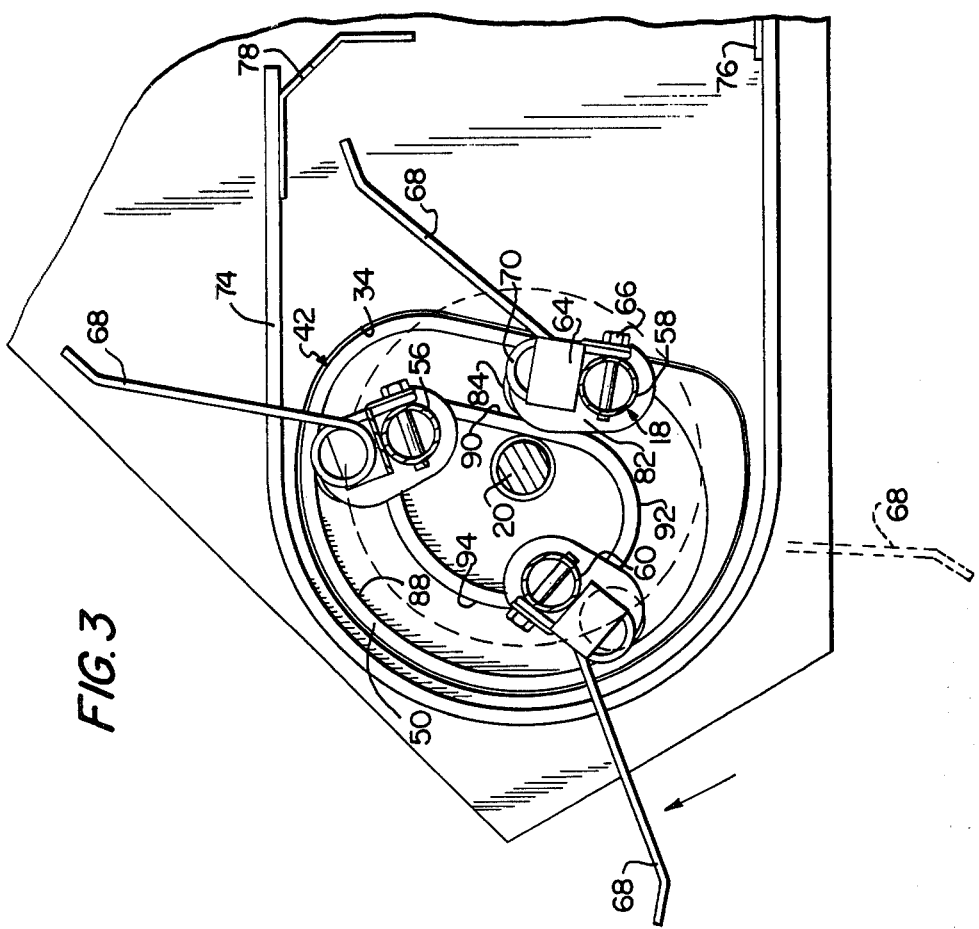
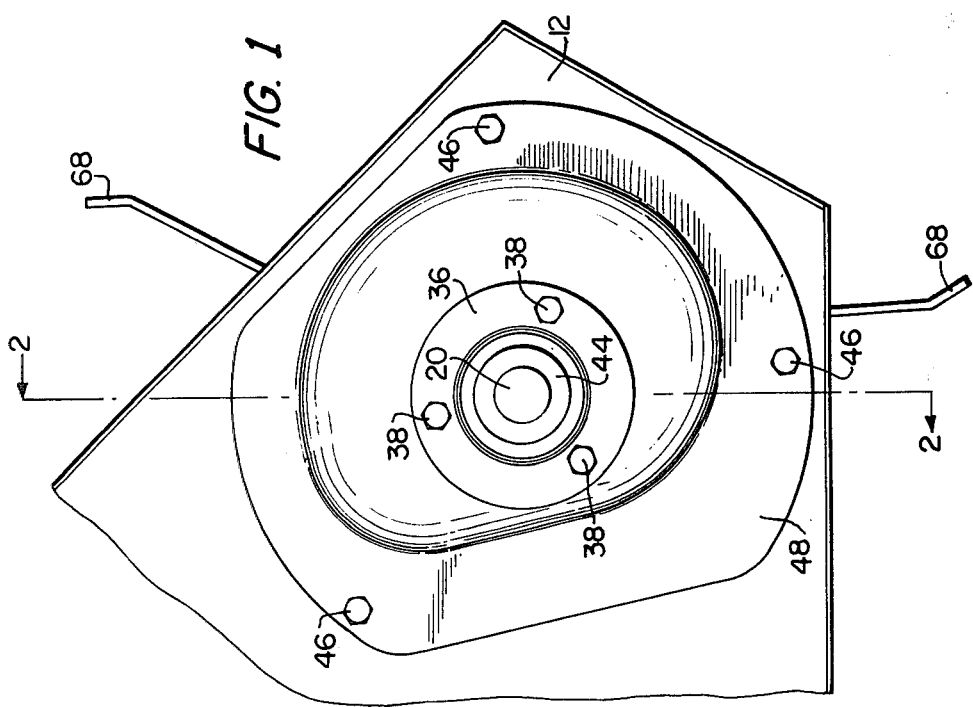

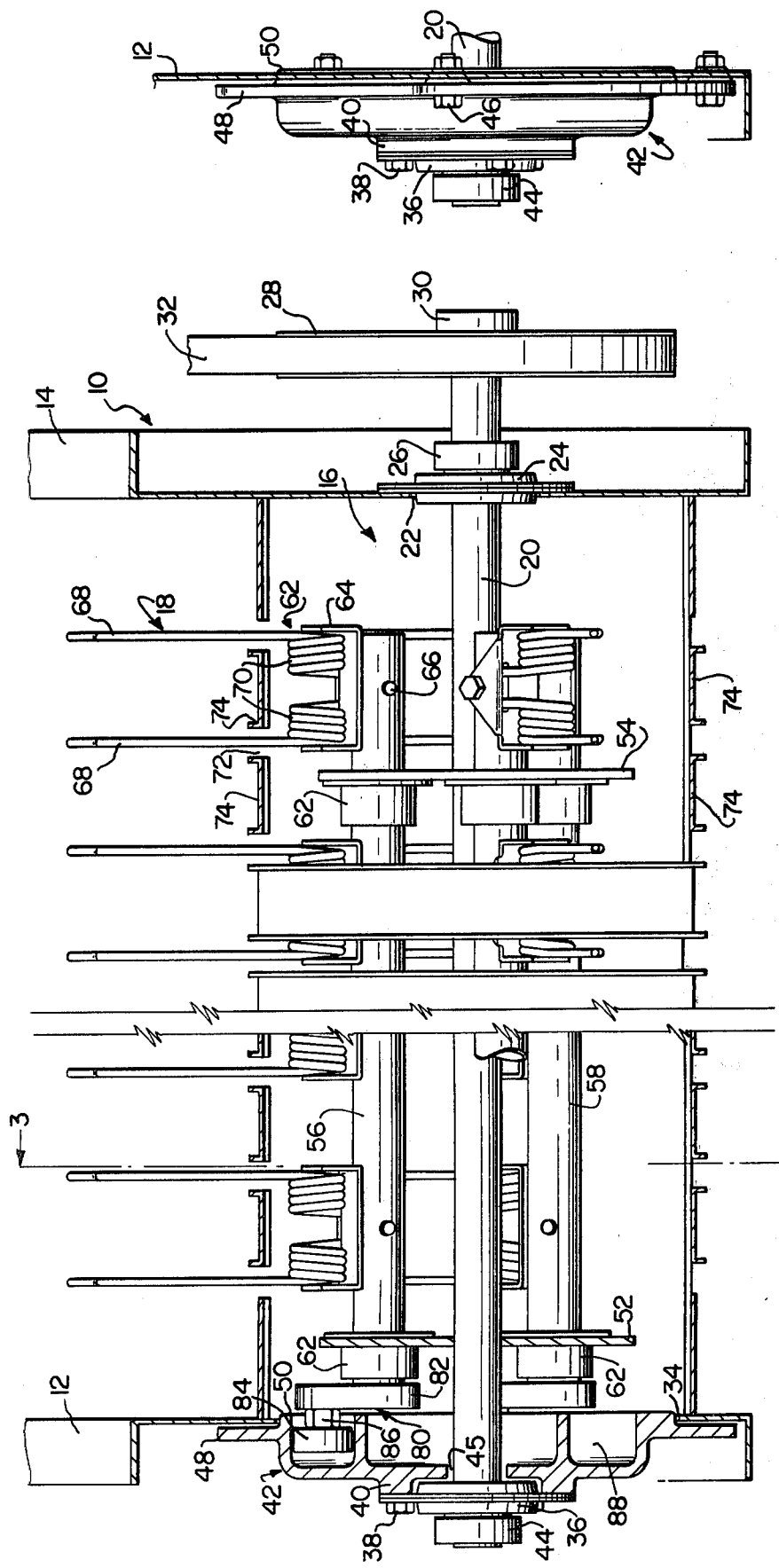

CROP PICKUP WITH OUTBOARD CAM CONTROL

TECHNICAL FIELD

This invention relates to the field of crop harvesting and, more particularly, to an improvement in mechanisms for picking up crop material from the ground and feeding the same to other apparatus for additional harvesting operations.

BACKGROUND ART

Typical crop pickup devices are provided with cam operated tines or fingers in conjunction with rotating reels of the devices. As the reel rotates in a direction to sweep the tines in an uplifting manner through the material and then feed it rearwardly, the tines are rocked to-and-fro in a special action which causes the tines to project substantially radially during their crop-lifting action yet fold back obliquely during the last half of their cycle of revolution so as to pull generally straightly down through strippers that help release the crop material from the tines.

Typically, these operating cams or cam tracks have been mounted on the inboard side of an endwall of the pickup device. But such an arrangement occupies space that could otherwise be used by extra tines so as to yield additional crop feeding and control. Furthermore, such an inboard mounted arrangement requires that in order to service the cam track or the following rollers and rockers associated with that end of the reel, it is necessary to detach and remove several of the strippers that house the working components of the reel, as well as to detach and remove additional components, all of which not only represents a substantial amount of work and effort, but also a considerable amount of precious time.

SUMMARY OF THE PRESENT INVENTION

Accordingly, one important object of the present invention is to provide a crop pickup device in which the operating cam track for the cam action pickup tines is located outboard of an end or sidewall of the pickup device yet remains in proper operating relationship with the cam followers of the reel so as to obtain the significant advantages of such an outboard mounted arrangement without in any way diminishing the functional performance of the pickup.

Pursuant to the foregoing, the present invention contemplates providing a relatively large opening in that sidewall of the pickup to which the cam track is to be mounted. The cam track is attached to the sidewall on the outboard surface of the latter with the bulk of the track projecting laterally outwardly beyond the sidewall, there being only a relatively short rim projecting into the opening and in substantial engagement with the lateral confinements of the opening so as to properly locate the cam track. To service the cam-operated end of the reel it is but necessary to detach the cam track from its mountings on the sidewall after first removing bearing structure and the like for the main shaft of the reel, such detachment of the cam track fully exposing not only the cam-following rollers, but also all of their associated rocker arms and rendering the same fully and easily accessible through the large opening in the sidewall.

BRIEF DESCRIPTION OF THE DRAWINGS

FIG. 1 is a fragmentary, side elevational view of a crop pickup device employing the outboard cam mounting concepts of the present invention, the figure illustrating that end of the pickup device which is provided with the attached cam track;

FIG. 2 is a fragmentary, longitudinal, cross-sectional view through the pickup device taken substantially along line 2—2 of FIG. 1;

FIG. 3 is a fragmentary, transverse, cross-sectional view of the pickup device taken substantially along line 3—3 of FIG. 2; and FIG. 4 is a fragmentary, front end elevational view of the cam track and its associated structures with the sidewall to which it is attached shown in cross section for clarity.

DETAILED DESCRIPTION

The pickup device 10 is normally attached to the crop-receiving end of a harvesting machine for the purpose of lifting windrowed crop material off the ground and feeding such material into the main portion of the machine for further processing such as, for example, baling into rectangular or cylindrical bales. The device 10 includes a pair of sidewalls 12 and 14 which are spaced apart laterally with respect to the normal direction of travel of the machine with which the pickup 10 is associated. A reel designated generally by the numeral 16 extends between the sidewalls 12,14 and is rotatable about an axis transverse to the direction of travel of the pickup 10, the reel 16 including a plurality of crop-engaging structures designated generally by the numeral 18 which project transversely outwardly from the axis of rotation of the reel 16 and which are operable upon rotation of the latter in the direction as illustrated in FIG. 3 to engage, lift and convey crop material upwardly and rearwardly with respect to the orientation of the pickup 10 as illustrated in FIG. 3.

The reel 16 further includes a main drive shaft 20 which spans the sidewalls 12,14 and projects outwardly beyond the same at its opposite ends. At the sidewall 14, the shaft 20 passes through a hole 22 within which is partly located a bearing 24 which journals the shaft 20 for rotation about its longitudinal axis. A collar 26 situated just outboard of the bearing 24 is attached to the shaft 20 to prevent axial displacement of the latter in an inboard direction. The shaft 20 extends beyond the collar 26 and at its outermost end carries a sheave 28 retained in place by another collar 30, the sheave 28 being entrained by a belt 32 leading to a source of driving power (not shown) for the shaft 20.

At the opposite end of the reel 16, the shaft 20 passes through a large opening 34 in the sidewall 12 and is journaled by a bearing 36 which in turn is attached by machine screws 38 to a boss 40 on the external face of a cam track 42, the cam track 42 being illustrated herein in the form of a metal casting. A collar 44 immediately outboard of the bearing 36 is secured to the shaft 20 and prevents axial displacement of the latter in an inboard direction, the shaft 20 passing through a hole 45 in the track 42. The casting or cam track 42 is attached to the sidewall 12 on the outboard face thereof by a series of mounting bolts 46 in a peripheral lip 48 that overlaps the area of the sidewall 12 immediately adjacent the lateral extent of the opening 34. An inboard-extending rim 50 of the cam track 42 is situated radially inwardly of the lip 48 so as to be inserted into the opening 34 and lie next adjacent to the lateral extent of the latter, thereby serving to properly locate the cam track 42 with respect to the opening 34.

The reel 16 is also provided with at least a pair of mounting plates 52 and 54 situated at longitudinally spaced locations along the shaft 20 and fixed to the latter for rotation therewith. Each of the plates 52,54 is perforated at three locations so as to receive corresponding rockshafts 56, 58 and 60, each of the plates 52,54 having suitable bearings 62 associated with the rockshafts 56, 58 and 60 thereof so as to support the rockshafts 56, 58 and 60 for rotation of the same about their respective longitudinal axes. The rockshafts 56, 58 and 60 are spaced at 120° intervals about the central shaft 20 and are maintained by the plates 52,54 in parallel relationship with the main shaft 20.

The rockshafts 56, 58 and 60 form one part of the mechanism hereinabove designated as crop-engaging structures 18, another part of such structures 18 comprising individual tine units 62, all of identical construction, mounted on the rockshafts 56, 58 and 60, there being a longitudinal series of such units 62 on each of the rockshafts 56, 58 and 60. Each of the units 62 includes a bracket 64 secured to the corresponding rockshafts 56, 58 or 60 via a screw 66, each of the brackets 64 in turn carrying a pair of integrally interconnected, outwardly projecting tines 68 which are formed adjacent their inner ends into spring coils 70 so as to provide yieldable flexibility should hard objects such as stones and the like be encountered during rotation of the reel 16. The tines 68 project through slots 72 formed between adjacent elongated strippers 74 looped around the reel 16 in the manner illustrated in FIG. 3, each of the strippers 74 being attached at its normally lower end to suitable mounting structure 76 as illustrated in FIG. 3 and at its normally upper end to suitable mounting structure 78 as also depicted in that same figure. Each of the crop-engaging structures 18 of the reel 16 is provided with an operating rocker 80 at the end of the reel 16 most adjacent the cam track 42, said rocker 80 including a crank arm 82 rigidly affixed to the corresponding rockshaft 56, 58 or 60 and situated alongside the opening 34 inboard of the latter, a cam-following roller 84 situated outboard of the opening 34, and a mounting shaft 86 rotatably connecting the roller 84 with the outer end of its corresponding crank arm 82. All of the following rollers 84 are received within the continuous, irregular track portion 88 of the cam track 42, said track portion 88 having the configuration illustrated most clearly in FIG. 3 and being situated substantially wholly outboard of the pickup device 10.

OPERATION

The operation of the pickup device 10 should be readily apparent from the foregoing description. However, certain specific aspects of such operation will now be set forth as follows.

When the main shaft 20 is driven in a clockwise direction viewing FIG. 3 by the drive belt 32, the rockshafts 56, 58 and 60 are carried about the axis of rotation of the shaft 20 by the plates 52,54. However, each of the rockshafts 56, 58 and 60 is rotatably journaled by its bearings 62, and as a consequence of the fact that the rollers 84 are confined to the path of travel defined by the track portion 88 of cam track 42, the rockshafts 56, 58 and 60 and their tines 68 are caused to rock to-and-fro in the manner illustrated in FIG. 3. Note in this regard that during the initial upsweep of the tines 68 as illustrated in FIG. 3, the tines 68 project generally radially outwardly from the reel 16. And, at the top of their circle of revolution, the tines 68 still project substantially radially outwardly. However, immediately thereafter the following rollers 84 move down along a straight stretch 90 of the track portion 88, causing the corresponding tines 68 to be drawn down rather straightly through the strippers 74, this assisting in proper release and stripping of the crop materials from the tines 68. Then, as the followers 84 move around a lower rounded stretch 92 of the track portion 88, the tines 68 are flipped back toward a general radial condition where they remain as the following rollers 84 move around the rounded, concentric stretch 94 of the track portion 88 as above described.

Hence, the manner of operation of the reel 16, particularly the special action of the tines 68, is unchanged from conventional arrangements. Yet, the cam track 42 which controls and effects such action is mounted on the outboard side of the sidewall 12 in contra-distinction to conventional arrangements. As a result of this construction, space which was previously occupied by a control cam inboard of the sidewall 12 can now be devoted to one or more additional tines 68, yielding additional crop engagement and lifting control.

Furthermore, the major operating components of the reel 16 are much more serviceable with the construction of the present invention than conventional arrangements. In this regard, in order to gain access to the rockers 80, it is merely necessary to remove the collar 44, detach the bearing 36 via its mounting screws 38, remove the mounting bolts 46 from the lip 48 of the cam track 42, and then pull the cam track 42 itself. This fully exposes the following rollers 84, their connecting shafts 86, the crank arms 82, and the bearings 62 such that all can be readily serviced via the large opening 34. Replacement of the removed components is a simply reversal of the above process.

I claim:

1. A crop pickup device comprising:
    a pair of laterally spaced, stationary sidewalls;
    a reel adapted for rotation about an axis extending between said sidewalls and including crop-engaging structure projecting transversely outwardly of said axis for engaging crop material during rotation of the reel and for feeding the same along a path of delivery generally transverse to said axis of rotation of the reel,
    said structure being mounted for rocking movement to-and-fro in a prescribed pattern with respect to the direction of rotation of the reel during said rotation to improve the feeding action thereof, and being provided with an operating rocker adjacent one end of the reel; and
    a stationary cam track mounted outboard of the sidewall adjacent said one end of the reel and operably receiving said rocker for effecting said rocking movement of the structure as the rocker is carried with the reel about said axis,
    said one sidewall being provided with an opening through which said rocker and said cam track maintain their operative interengagement and through which access to said structure is afforded from the exterior of said one sidewall when said cam track is removed.

2. A crop pickup as claimed in claim 1, wherein said rocker projects outwardly through said opening and into said track.

3. A crop pickup as claimed in claim 2, wherein said reel is provided with a main drive shaft projecting outwardly through said opening, said track having bearing means associated therewith for rotatably supporting said shaft at a location outboard of said one sidewall.

4. A crop pickup as claimed in claim 1, wherein said track is provided with a rocker-receiving portion located within the lateral confines of said opening, and with a mounting portion projecting beyond said lateral confines of the opening into overlapping relationship with adjacent areas of said one sidewall for attachment thereto.

5. A crop pickup as claimed in claim 4, wherein said track includes an inwardly projecting rim between said rocker-receiving portion and said mounting portion, said rim being disposed laterally inwardly adjacent said lateral confines of said opening for locating the track with respect to the opening.

6. A crop pickup as claimed in claim 1, wherein said rocker includes a crank arm positioned alongside said opening inboard of the latter, a following roller positioned in said track outboard of said opening, and a shaft attaching the roller to said arm and projecting transversely through the opening.

* * * * *